US012467179B2

(12) United States Patent
Masters, Jr. et al.

(10) Patent No.: US 12,467,179 B2
(45) Date of Patent: Nov. 11, 2025

(54) APPARATUS FOR HEATING INLET AIR IN A COMBINATION WASHER/DRYER

(71) Applicant: Whirlpool Corporation, Benton Harbor, MI (US)

(72) Inventors: Roy Edward Masters, Jr., St. Joseph, MI (US); Robert Unglenieks, Holland, MI (US)

(73) Assignee: Whirlpool Corporation, Benton Harbor, MI (US)

(*) Notice: Subject to any disclaimer, the term of this patent is extended or adjusted under 35 U.S.C. 154(b) by 711 days.

(21) Appl. No.: 17/893,645

(22) Filed: Aug. 23, 2022

(65) Prior Publication Data

US 2024/0068145 A1 Feb. 29, 2024

(51) Int. Cl.

| | |
|---|---|
| ***D06F 25/00*** | (2006.01) |
| ***D06F 37/04*** | (2006.01) |
| ***D06F 37/26*** | (2006.01) |
| ***D06F 58/04*** | (2006.01) |
| ***D06F 58/20*** | (2006.01) |
| ***D06F 58/26*** | (2006.01) |
| ***H05B 3/06*** | (2006.01) |

(52) U.S. Cl.

CPC .............. *D06F 25/00* (2013.01); *D06F 37/04* (2013.01); *D06F 37/266* (2013.01); *D06F 58/04* (2013.01); *D06F 58/206* (2013.01); *D06F 58/26* (2013.01); *H05B 3/06* (2013.01); *H05B 2203/007* (2013.01)

(58) Field of Classification Search

CPC ........ D06F 25/00; D06F 37/04; D06F 37/266; D06F 58/04; D06F 58/26; H05B 3/06; H05B 2203/007

USPC .................................................... 34/595–610

See application file for complete search history.

(56) References Cited

U.S. PATENT DOCUMENTS

| | | | | |
|---|---|---|---|---|
| 5,669,157 A * | 9/1997 | Kuipers | D06F 95/00 34/607 |
| 7,644,514 B2 * | 1/2010 | Heyder | F16C 23/08 34/609 |
| 7,681,420 B2 | 3/2010 | Jeong et al. | |
| 7,984,568 B2 * | 7/2011 | Dittmer | D06F 58/24 219/757 |
| 8,800,165 B2 * | 8/2014 | Kwon | D06F 29/005 68/12.12 |

(Continued)

FOREIGN PATENT DOCUMENTS

| | | | |
|---|---|---|---|
| BR | 112014007131 B1 * | 2/2021 | D06F 58/206 |
| CN | 101876138 A | 11/2010 | |

(Continued)

*Primary Examiner* — Stephen M Gravini

(74) *Attorney, Agent, or Firm* — Brooks Kushman, P.C.

(57) ABSTRACT

A laundry appliance including a cabinet, a tub, and a drum. The tub is positioned inside the cabinet. The tub includes a front tub wall having a front tub opening, a rear tub wall, and a tub sidewall that extends between the front tub wall and the rear tub wall. The drum is rotatably supported within the tub. The drum includes a front drum opening, a rear drum wall, a drum sidewall that extends between the front drum opening and the rear drum wall, and a laundry compartment positioned inside the drum that is accessible through the front drum opening. An air gap is positioned radially between the tub sidewall and the drum sidewall. At least one heating element is positioned on or in the tub sidewall to heat the tub sidewall and therefore air flowing through the air gap.

20 Claims, 5 Drawing Sheets

(56) References Cited

U.S. PATENT DOCUMENTS

| | | | | |
|---|---|---|---|---|
| 9,249,538 | B2 * | 2/2016 | Bison | D06F 58/24 |
| 9,488,412 | B2 * | 11/2016 | Yu | D06F 58/206 |
| 10,184,207 | B2 * | 1/2019 | Kim | F28D 7/1653 |
| 10,544,539 | B2 * | 1/2020 | Bocchino | D06F 58/22 |
| 11,319,661 | B1 * | 5/2022 | Maryanski | D06F 58/26 |
| 11,802,364 | B2 * | 10/2023 | Kakehi | D06F 39/04 |
| 11,828,017 | B2 * | 11/2023 | Zhou | D06F 58/04 |
| 2006/0179676 | A1 | 8/2006 | Goldberg et al. | |
| 2024/0068145 | A1 * | 2/2024 | Masters, Jr. | H05B 3/06 |
| 2025/0003138 | A1 * | 1/2025 | Vargas | B08B 7/02 |

FOREIGN PATENT DOCUMENTS

| | | | | |
|---|---|---|---|---|
| CN | 106436234 | B | 6/2020 | |
| DE | 2212436 | A1 | 9/1973 | |
| DE | 102005013053 | A1 * | 11/2006 | D06F 58/24 |
| DE | 102011079449 | A1 | 1/2013 | |
| KR | 100977926 | B1 | 8/2010 | |
| KR | 100986910 | B1 | 10/2010 | |
| KR | 20100129151 | A * | 12/2010 | D06F 58/22 |
| KR | 20190128468 | A | 11/2019 | |
| WO | WO-2006125682 | A1 * | 11/2006 | D06F 58/04 |
| WO | 2009077308 | A1 | 6/2009 | |

* cited by examiner

APPARATUS FOR HEATING INLET AIR IN A COMBINATION WASHER/DRYER

FIELD

The present disclosure relates to an apparatus for heating inlet air in a laundry appliance, such as a combination washer/dryer.

BACKGROUND

This section provides background information related to the present disclosure which is not necessarily prior art.

Laundry appliances (i.e., laundry machines, washing machines, and dryers) are prolific in both residential and commercial settings. Traditionally, separate washer and dryer machines have been used in tandem to clean and dry laundry. However, there is a growing market for washer and dryer combination appliances where a single machine performs both the washing and drying functions, thereby eliminating the need for two separate machines. There are a number of different names used to describe washer and dryer combination appliances, including without limitation, "washer/dryer combos" and "all-in-one washer dryers."

Many washer and dryer combination appliances have a front-load appliance configuration, where the washer and dryer combination appliance includes a cabinet (i.e., an appliance housing) with a front opening that is accessed by a front-mounted appliance door. A tub is positioned inside the cabinet. A drum is positioned in the tub and is rotatable with respect to the tub. The drum typically has a front end with a drum opening that provides access to a laundry compartment inside the drum.

While washer and dryer combination appliances save space compared to separate washer and dryer machines, combining the washing and drying functions into a single appliance presents a number of engineering challenges. For example, in traditional washer and dryer combination appliance designs, a heater box is positioned inside the cabinet to heat the drying air, which is then blown into the tub and the laundry compartment to dry the laundry inside the laundry compartment. Heating air in this manner results in high temperatures within the cabinet. Thus, traditional washer and dryer combination appliances require the use of components and materials inside the cabinet that are capable of withstanding high temperatures, which are expensive and limit material and design options. Additionally, the heated air often is able to bypass the laundry compartment and is ejected into the atmosphere outside the cabinet, without contacting the clothing within the laundry compartment. Accordingly, current washer and dryer combination appliance designs are limited in material selection and waste significant energy, which extends drying times for users. Solutions that improve the performance and efficiency of the drying cycle in washer and dryer combination appliances in the face of these challenges are needed.

SUMMARY

This section provides a general summary of the disclosure and is not a comprehensive disclosure of its full scope or all of its features.

In accordance with one aspect of the present disclosure, a laundry appliance is provided that comprises a cabinet, a tub, and a drum. The tub is positioned inside the cabinet. The tub includes a front tub wall having a front tub opening, a rear tub wall opposite the front tub wall, and a tub sidewall that extends between the front tub wall and the rear tub wall. The drum is rotatably supported within the tub. The drum includes a front drum opening, a rear drum wall opposite the front drum opening, a drum sidewall that extends between the front drum opening and the rear drum wall, and a laundry compartment positioned inside the drum that is accessible through the front drum opening. An air gap is positioned radially between the tub sidewall and the drum sidewall. An at least one heating element is positioned on or in the tub sidewall to heat the tub sidewall and therefore air flowing through the air gap between the tub sidewall and the drum sidewall. This heated air is then directed through the drum and into the laundry compartment for drying laundry therein.

In accordance with another aspect of the present disclosure, the tub includes a tub inlet that extends through the tub sidewall and is positioned adjacent to the front tub wall.

In accordance with another aspect of the present disclosure, the laundry appliance further comprises an air outlet that is positioned adjacent to the front drum opening and configured to receive drying air after the drying air passes through the laundry compartment in the drum.

In accordance with another aspect of the present disclosure, the laundry appliance further comprises a seal that extends annularly about the front drum opening and is positioned between the front tub opening and the front drum opening such that the seal is configured to direct air entering through the tub inlet to the air gap between the tub sidewall and the drum sidewall.

In accordance with another aspect of the present disclosure, the drum includes a drum inlet extending through the rear drum wall and configured to permit the passage of drying air from the air gap to the laundry compartment inside the drum.

In accordance with another aspect of the present disclosure, the drum inlet includes a plurality of perforations extending through the rear drum wall.

In accordance with another aspect of the present disclosure, the laundry appliance further comprises a bellows positioned between the front tub wall and the cabinet. The bellows extends annularly about the front tub opening and the air outlet extends through the bellows.

In accordance with another aspect of the present disclosure, the at least one heating element includes a plurality of heating elements that are positioned on the tub sidewall.

In accordance with another aspect of the present disclosure, the laundry appliance further comprises insulation disposed over the heating element(s) on the tub sidewall.

In accordance with another aspect of the present disclosure, a laundry appliance is provided that comprises a cabinet, a tub, a drum, an exhaust duct, and a heater. The cabinet includes a cabinet air inlet and an exhaust outlet. The tub is positioned inside the cabinet. The tub includes a front tub wall having a front tub opening, a rear tub wall opposite the front tub wall, and a tub sidewall that extends between the front tub wall and the rear tub wall. The drum is rotatably supported within the tub. The drum includes a front drum opening, a rear drum wall opposite the front drum opening, a drum sidewall that extends longitudinally between the front drum opening and the rear drum wall, and a laundry compartment positioned inside the drum. The exhaust duct is positioned inside the cabinet. The exhaust duct includes a first exhaust duct end that is arranged in fluid communication with the front drum opening and a second exhaust duct end that is arranged in fluid communication with the exhaust outlet of the cabinet. An air gap is positioned radially between the tub sidewall and the drum sidewall. The heater is positioned to heat air passing through the air gap between the tub sidewall and the drum sidewall before the air passes into the drum through a drum inlet in the rear drum wall.

In accordance with another aspect of the present disclosure, the laundry appliance further comprises a bellows positioned between the cabinet and the front tub wall. The bellows extends annularly about the front tub opening and the first exhaust duct end includes an exhaust port that extends through the bellows and is arranged in fluid communication with the first exhaust duct end.

In accordance with another aspect of the present disclosure, the laundry appliance further comprises an inner door pivotally attached to the cabinet or the tub such that the inner door opens and closes the tub opening. An exhaust port extends through the inner door and carries drying air from the laundry compartment to the first exhaust duct end.

In accordance with another aspect of the present disclosure, the tub includes a tub inlet that extends through the tub sidewall and is positioned adjacent to the front tub wall.

In accordance with another aspect of the present disclosure, the heater is a resistance heater, an induction heater, an infrared heater, or a heat pump.

In accordance with another aspect of the present disclosure, the heater includes at least one heating element that is mounted to the tub sidewall.

In accordance with another aspect of the present disclosure, the heater includes heating elements that are mounted to both the tub sidewall and the rear tub wall.

In accordance with yet another aspect of the present disclosure, a laundry appliance is provided that comprises a cabinet, a tub, a drum, an exhaust duct, an exhaust fan, and at least one heating element. The cabinet includes a cabinet air inlet and an exhaust outlet. The tub is positioned inside the cabinet. The tub includes a front tub wall having a front tub opening, a rear tub wall opposite the front tub wall, and a tub sidewall that extends between the front tub wall and the rear tub wall. The drum is rotatably supported within the tub. The drum includes a front drum opening, a rear drum wall opposite the front drum opening, a drum sidewall that extends between the front drum opening and the rear drum wall, and a laundry compartment positioned inside the drum. The exhaust duct is positioned inside the cabinet and extends from a first exhaust duct end positioned near the front tub opening and a second exhaust duct end arranged in fluid communication with the exhaust outlet of the cabinet. The exhaust fan is positioned in fluid communication with the exhaust duct to pull air in from the laundry compartment through the first exhaust duct end and push air out through second exhaust duct end and the exhaust outlet of the cabinet. An air gap is positioned radially between the tub sidewall and the drum sidewall. The at least one heating element is positioned to heat air flow passing through the air gap between the tub sidewall and the drum sidewall before the air flow passes into the drum through a drum inlet in the rear drum wall.

In accordance with another aspect of the present disclosure, the tub includes a tub inlet that is arranged in fluid communication with the cabinet air inlet and the air gap.

In accordance with another aspect of the present disclosure, an air flow path is defined when the exhaust fan is activated. Air enters the cabinet air inlet and flows along the air flow path to the tub inlet. The air then flows from the tub inlet to the air gap, through the air gap where the air flow is heated using the at least one heating element. The air in the air gap flows toward the rear tub wall and then passes into the drum via the drum inlet. The air then flows through the laundry compartment in the drum and to the first exhaust duct end, where it enters the exhaust duct and is carried to the exhaust outlet of the cabinet.

Advantageously, the laundry appliance described herein improves the performance and efficiency of the drying cycle, and increases the material selection options available for components within the cabinet of the laundry appliance. More specifically, the heating elements positioned on or in the tub sidewall heat air as it flows through the air gap between the tub sidewall and the drum sidewall. Accordingly, the heating elements are positioned to heat the air within the tub that is enroute to the laundry compartment of the drum. This avoids the need to heat the air flowing outside of the tub.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 1:
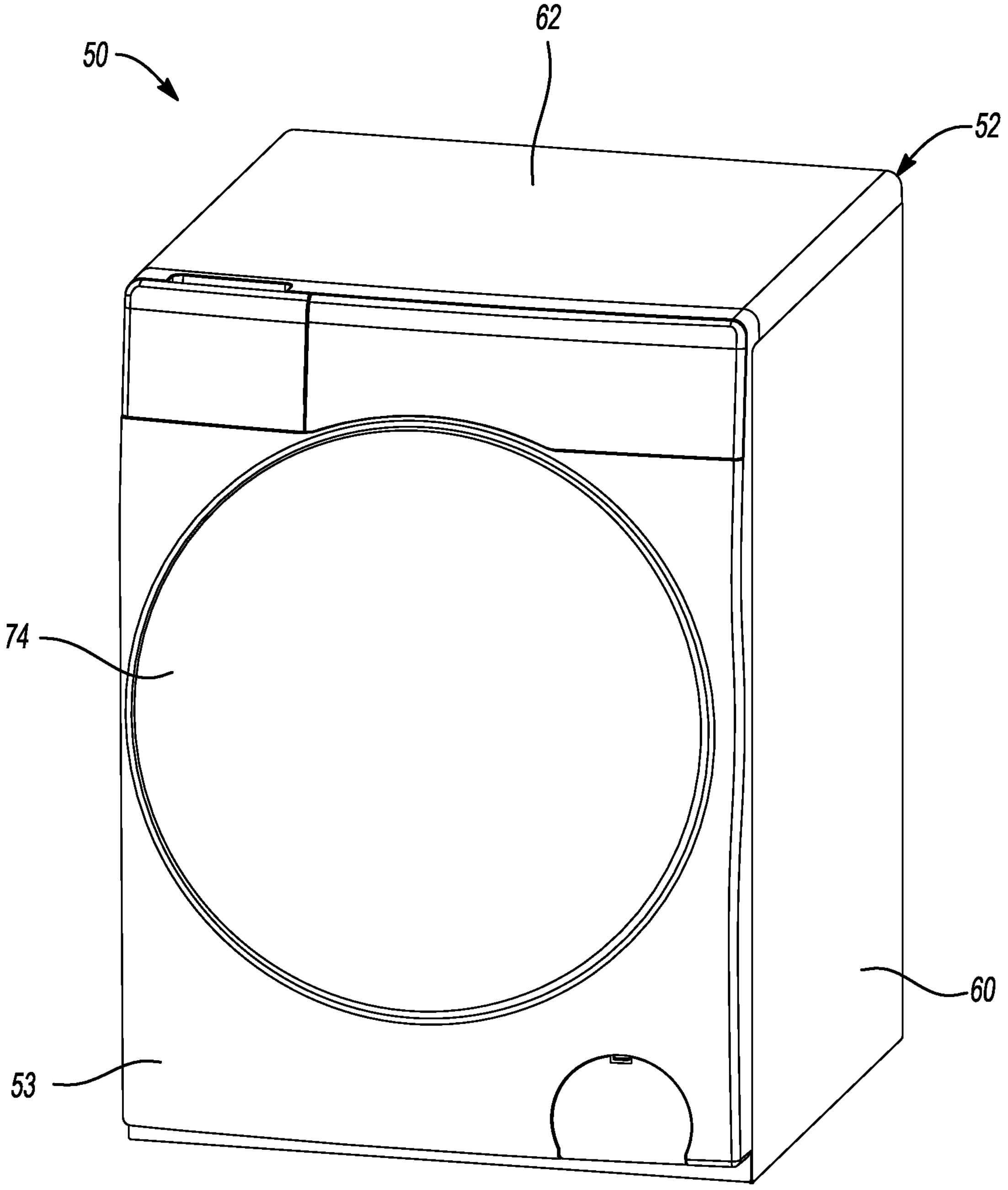
FIG. 1 is a front perspective view of a laundry appliance constructed in accordance with the present disclosure.
Figure 3:
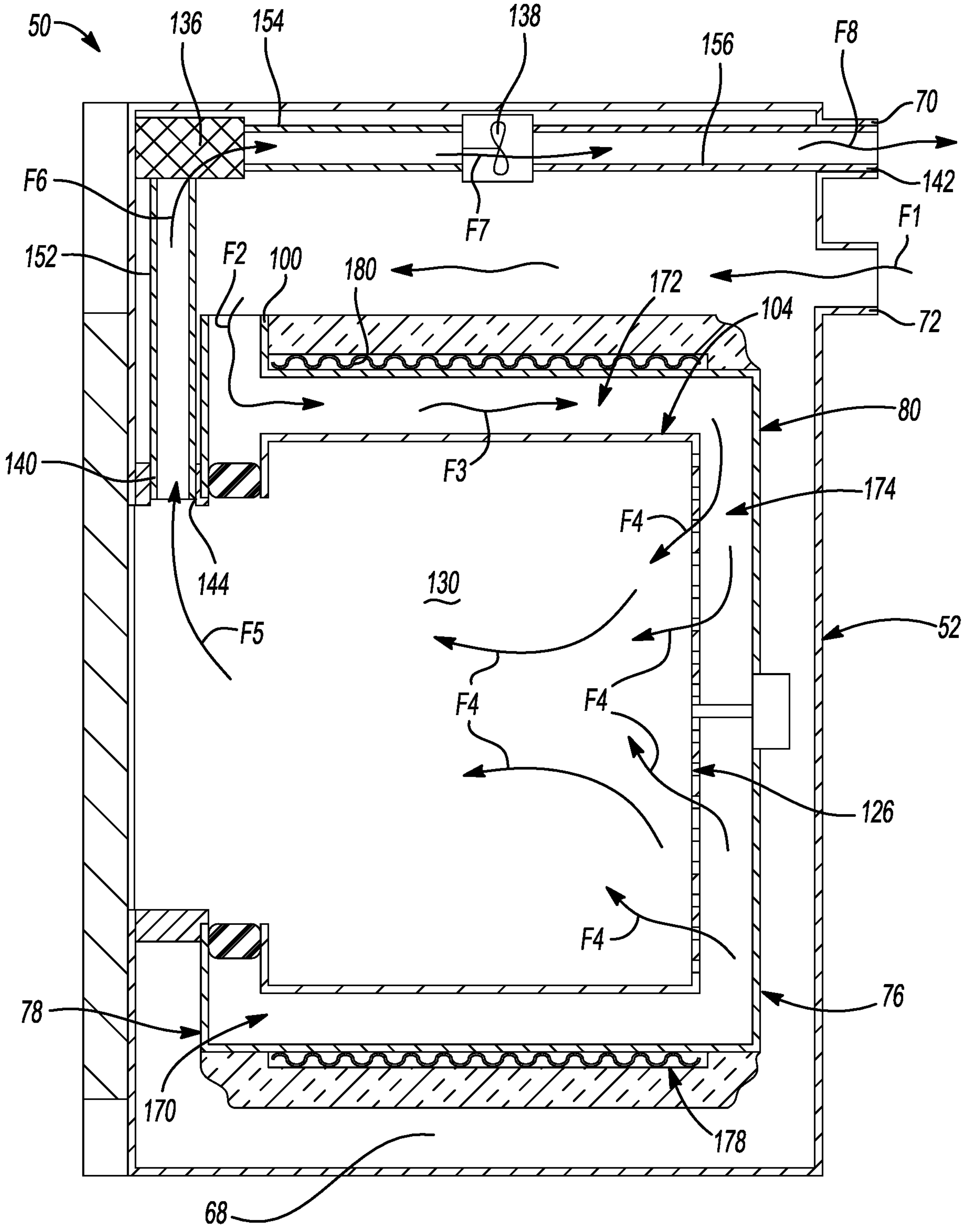
Figure 4:
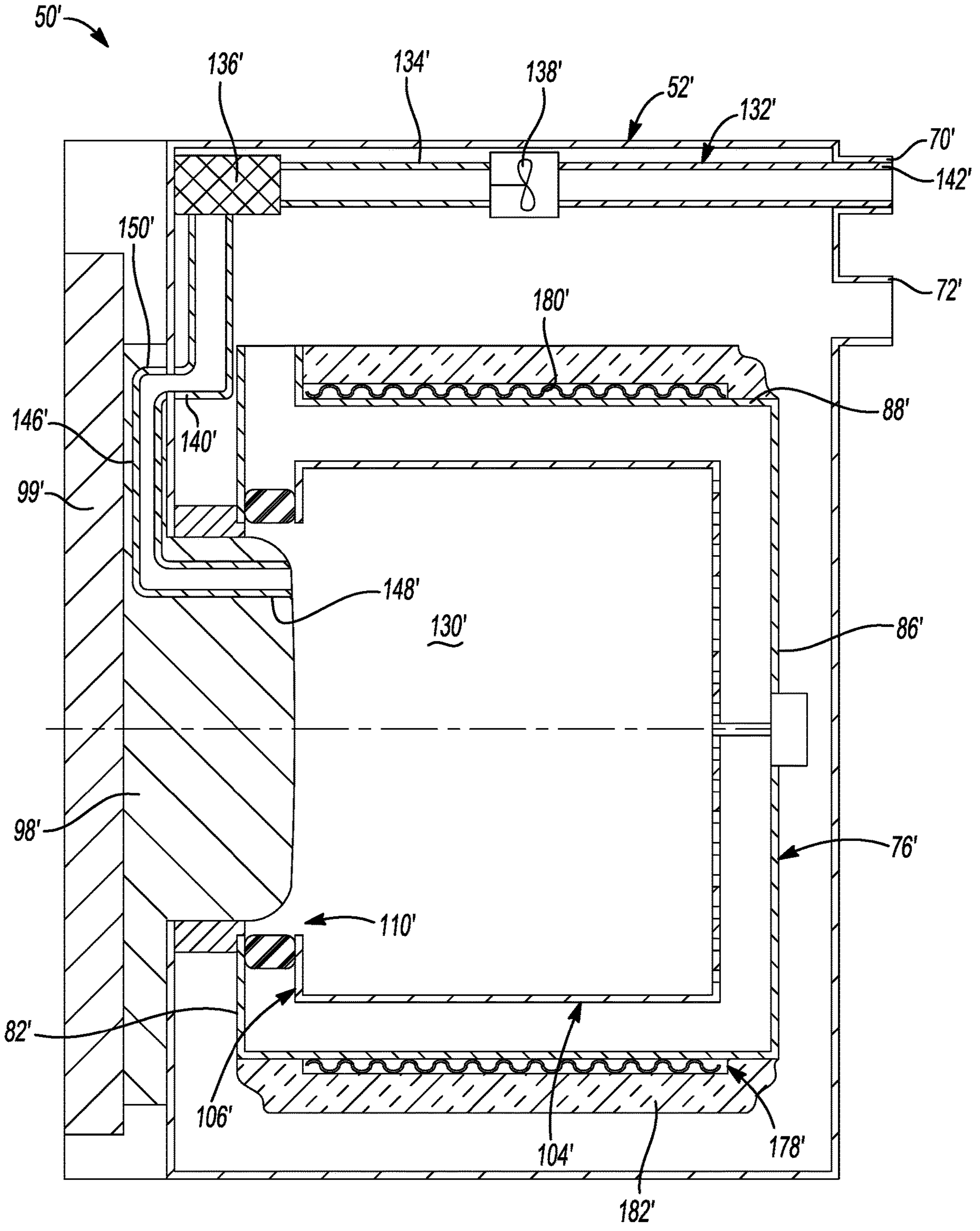
Figure 5:
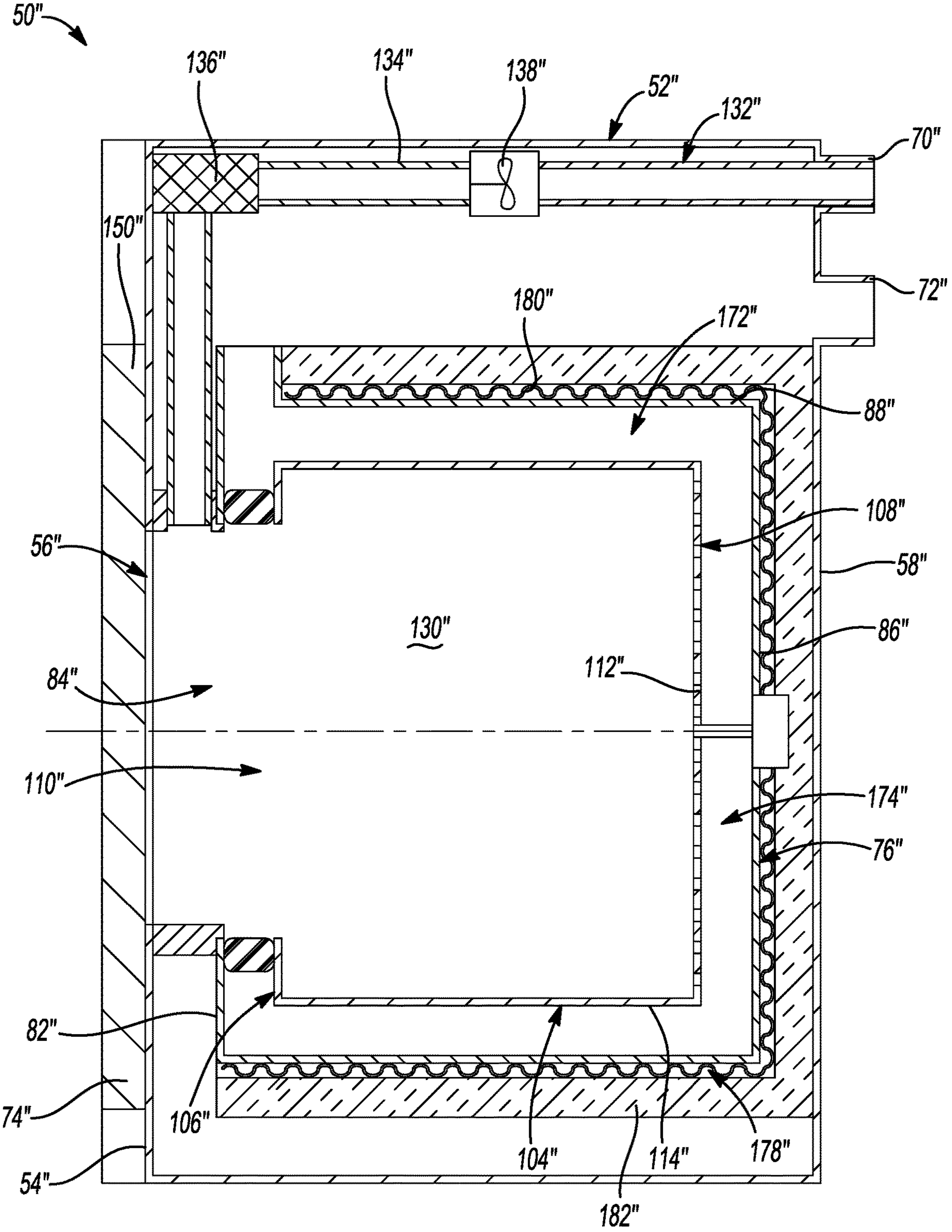

FIG. 3. is a side cross-sectional view of the exemplary laundry appliance shown in FIG. 1, where arrows are included illustrating an air flow path through the laundry appliance:

FIG. 4 is a side cross-sectional view of another laundry appliance constructed in accordance with the present disclosure, where the laundry appliance includes an inner door and an outer door; and FIG. 5 is a side cross-sectional view of another laundry appliance constructed in accordance with the present disclosure, where heating elements are attached to a tub sidewall and a rear tub wall.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
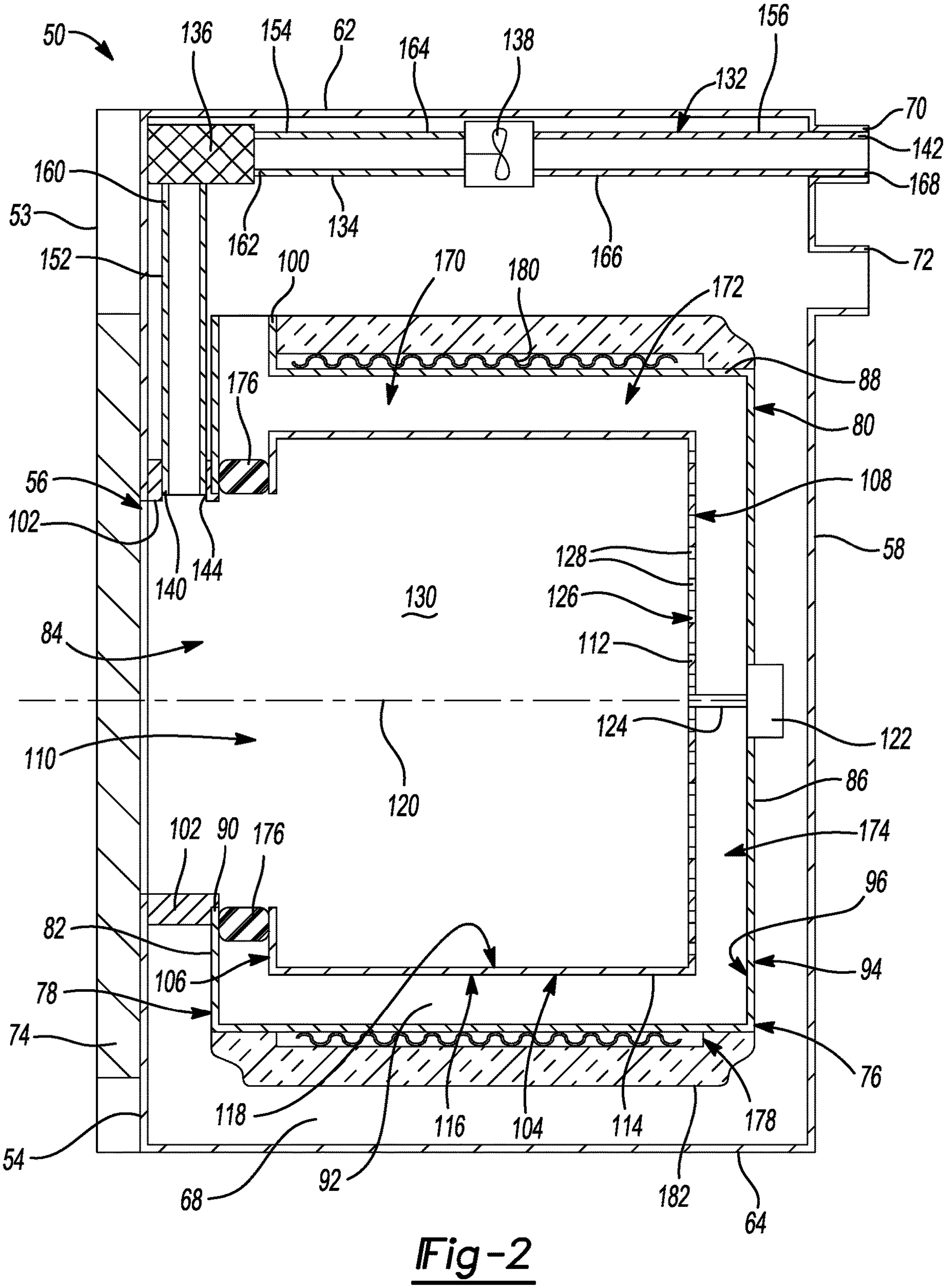
FIG. 2 is a side cross-sectional view of the exemplary laundry appliance shown in FIG. 1.

With reference to FIGS. 1 and 2, a laundry appliance 50 having a front-load configuration is illustrated. The laundry appliance 50 includes a cabinet 52 that is rectangular in shape and a front facia 53 attached to the cabinet 52. The cabinet 52 includes a front cabinet wall 54 having a front cabinet opening 56, a rear cabinet wall 58 opposite the front cabinet wall 54, a set of cabinet sidewalls 60 that extend between the front cabinet wall 54 and the rear cabinet wall 58, a top cabinet wall 62, and a bottom cabinet wall 64. The front cabinet wall 54, rear cabinet wall 58, set of cabinet sidewalls 60, top cabinet wall 62, and bottom cabinet wall 64 cooperate to define a cabinet cavity 68 inside the cabinet 52. In the illustrated example, an exhaust outlet 70 extends through the rear cabinet wall 58 and is positioned adjacent to the top cabinet wall 62. However, the exhaust outlet 70 may extend through the rear cabinet wall 58, the set of cabinet sidewalls 60 or the bottom cabinet wall 64 and may be positioned adjacent to the top cabinet wall 62 or the bottom cabinet wall 64. A cabinet air inlet 72 extends through the rear cabinet wall 58. In the illustrated example, the cabinet air inlet 72 is positioned below the exhaust outlet 70. However, the cabinet air inlet 72 may be in another position relative to the exhaust outlet 70, such as beside the exhaust outlet 70. Air enters the cabinet 52 via the cabinet air inlet 72 and air exits the cabinet 52 via the exhaust outlet 70, which may be configured to connect to a vent tube (not shown) that carries exhaust air to the outdoor environment.

A front appliance door 74 is pivotally connected to the cabinet 52, and more specifically, the front cabinet wall 54. The front appliance door 74 swings between an open position and a closed position. In the closed position, the front appliance door 74 shuts or closes the front cabinet opening 56. Although other materials can be used, in the illustrated example, the front appliance door 74 is composed of metal. In some configurations and as illustrated in FIG. 2, the front appliance door 74 is flush with the front facia 53. However, the front appliance door 74 may not be flush with the front facia 53 in other configurations.

The laundry appliance 50 includes a tub 76 that is mounted inside the cabinet cavity 68 using one or more suspension elements (not shown). The suspension elements keep the tub 76 from rotating but permit limited degrees of freedom that allow the tub 76 to move/oscillate relative to the cabinet 52 during the operation of the laundry appliance 50. The tub 76 has a substantially cylindrical shape and extends between a front tub end 78 and a rear tub end 80. The tub 76 includes a front tub wall 82 having a front tub opening 84 at the front tub end 78, a rear tub wall 86 at the rear tub end 80, and a tub sidewall 88 that extends between the front and rear tub ends 78, 80. The front tub end 78 includes a rim 90 that extends annularly about the front tub opening 84. The front tub wall 82, rear tub wall 86, and tub sidewall 88 define a tub cavity 92 inside the tub 76. The tub 76 includes an outer tub surface 94 facing the cabinet 52 and an inner tub surface 96 that is opposite the outer tub surface 94. Although other materials can be used, in the illustrated example, the tub 76 is composed of steel.

The tub 76 includes a tub inlet 100 that extends through the tub sidewall 88 and is positioned adjacent to the front tub wall 82. The tub inlet 100 is arranged in fluid communication with the cabinet air inlet 72. In one example, the tub inlet 100 is in fluid communication with the cabinet cavity 68. Accordingly, air from the cabinet cavity 68 enters the tub inlet 100. In another example, an intake duct (not shown) may extend between the tub inlet 100 and the cabinet air inlet 72. Either way, air entering the cabinet air inlet 72 is directed to flow into the tub 76 via the tub inlet 100.

A bellows 102 is positioned between the front tub wall 82 and the front cabinet wall 54. The bellows 102 extends annularly about the front tub opening 84 and is attached to the rim 90 of the front tub opening 84. The bellows 102 prevents fluid and laundry inside the tub 76 from entering the cabinet cavity 68.

The laundry appliance 50 includes a drum 104 that is positioned in the tub cavity 92. The drum 104 has a cylindrical shape and extends between a front drum end 106 and a rear drum end 108. The drum 104 includes a front drum opening 110 at the front drum end 106, a rear drum wall 112 at the rear drum end 108, and a drum sidewall 114 that extends between the front and rear drum ends 106, 108.

The drum 104 includes an outer drum surface 116 that faces the tub 76 and an inner drum surface 118 that is opposite the outer drum surface 116.

The drum 104 is supported within the tub cavity 92 and is rotatable with respect to the tub 76 about an axis 120. An electric motor 122 is positioned within the cabinet 52. More specifically, the electric motor 122 is attached to rear tub end 80. The electric motor 122 is connected to a drive shaft 124 that extends from the electric motor 122 to the rear drum end 108 of the drum 104. The drive shaft 124 is aligned with the axis 120. The electric motor 122 operates to drive rotation of the drive shaft 124, which in turn drives rotation of the drum 104 within the tub 76.

A drum inlet 126 extends through the rear drum wall 112 such that the tub cavity 92 and the drum 104 are in fluid communication with each other. The drum inlet 126 includes a plurality of perforations 128 disposed through the rear drum wall 112. In some configurations, the drum inlet 126 may extend through both the rear drum wall 112 and the drum sidewall 114. In accordance with such a configuration, the rear drum wall 112 may have a greater number of perforations 128 than the drum sidewall 114. Accordingly, more air enters the drum 104 via the perforations 128 in the rear drum wall 112 than those in the drum sidewall 114.

The front drum end 106, the drum sidewall 114, and the rear drum wall 112 cooperate to define a laundry compartment 130 inside the drum 104. The laundry compartment 130 is arranged in fluid communication with the tub cavity 92 via the drum inlet 126. The front cabinet opening 56 in the front cabinet wall 54, the front tub opening 84 in the front tub wall 82, and the front drum opening 110 at the front drum end 106 are at least partially aligned with one another and therefore provide access to the laundry compartment 130 inside the drum 104 when the front appliance door 74 is in the open position. In the illustrated example, the front cabinet opening 56 in the front cabinet wall 54, the front tub opening 84 in the front tub wall 82, and the front drum opening 110 at the front drum end 106 are aligned with the axis 120. It should be appreciated that in use, laundry (e.g., clothes, towels, and/or bedding, etc.) is placed inside the laundry compartment 130 where it is first cleaned during the wash cycle and then dried during the drying cycle of the laundry appliance 50.

The laundry appliance 50 includes an exhaust system 132 that includes an exhaust duct 134, a removable lint screen 136 and an exhaust fan 138. The exhaust duct 134 is positioned inside the cabinet cavity 68 and extends between a first exhaust duct end 140 and a second exhaust duct end 142. The first exhaust duct end 140 is arranged in fluid communication with the laundry compartment 130. The second exhaust duct end 142 is arranged in fluid communication with the exhaust outlet 70.

As shown in FIG. 2, the first exhaust duct end 140 is secured to the bellows 102 and the second exhaust duct end 142 is secured to the exhaust outlet 70 of the cabinet. A first exhaust port 144 extends through the bellows 102 and is arranged in fluid communication with the first exhaust duct end 140. Accordingly, the first exhaust duct end 140 is arranged in fluid communication with the laundry compartment 130, the front drum opening 110, and the front tub opening 84 via the first exhaust port 144 in the bellows 102.

The exhaust duct 134 includes a first exhaust duct segment 152, a second exhaust duct segment 154 and a third exhaust duct segment 156. The first, second, and third exhaust duct segments 152, 154, 156 may be one single piece, or alternatively separate pieces. Each of the first, second, and third exhaust duct segments 152, 154, 156 may be formed in any shape, including linear shapes or curved shapes. The first exhaust duct segment 152 is positioned between the cabinet 52 and the front tub wall 82 and extends between a first duct segment end 158 and a second duct segment end 160. The first duct segment end 158 is arranged in fluid communication with the laundry compartment 130 via the first or second exhaust port 144, 146. The second duct segment end 160 is arranged in fluid communication with the removable lint screen 136.

The second exhaust duct segment 154 is disposed within the cabinet cavity 68 and positioned near the top cabinet wall 62. The second exhaust duct segment 154 extends between a third duct segment end 162 and a fourth duct segment end 164. The third duct segment end 162 is arranged in fluid communication with the removable lint screen 136. The fourth duct segment end 164 is attached to the exhaust fan 138.

The third exhaust duct segment 156 is also disposed within the cabinet cavity 68 and positioned near the top cabinet wall 62. The third exhaust duct segment 156 extends between a fifth duct segment end 166 and a sixth duct segment end 168. The fifth duct segment end 166 is attached to the exhaust fan 138. The sixth duct segment end 168 is arranged in fluid communication with the exhaust outlet 70.

The removable lint screen 136 is positioned between the first and second exhaust duct segments 152, 154 and is arranged in fluid communication with the first and second exhaust duct segments 152, 154. Air and lint may flow from the laundry compartment 130, through the first exhaust duct segment 152, and to the removable lint screen 136. Air is able to pass through the removable lint screen 136 from the first exhaust duct segment 152 to the second exhaust duct segment 154. However, lint is trapped in the removable lint screen 136. Accordingly, lint is collected on the removable lint screen 136. The removable lint screen 136 is operable to be removed from the laundry appliance 50 and cleaned or replaced. In the illustrated example, the removable lint screen 136 is positioned adjacent to the top cabinet wall 62 and front cabinet wall 54 such that it has a drawer-like configuration for easy removal. However, the removable lint screen 136 may be positioned in other locations within the cabinet cavity 68 and have different configurations.

The exhaust fan 138 is positioned between the second and third exhaust duct segments 154, 156 and is arranged in fluid communication with the second and third exhaust duct segments 154, 156. The exhaust fan 138 pulls air in from the laundry compartment 130 and into the exhaust duct 134 via first exhaust duct end 140. The exhaust fan 138 pushes air out the exhaust duct 134 via the second exhaust duct end 142 and the exhaust outlet 70 of the cabinet 52. More specifically, the exhaust fan 138 pulls air from the laundry compartment 130 and air flows through the front drum opening 110, through front tub opening 84, and then through the first and second exhaust duct segments 152, 154. The exhaust fan 138 pushes air through the third exhaust duct segment 156 and out the exhaust outlet 70. In the illustrated example, the exhaust fan 138 is positioned adjacent to the top cabinet wall 62 and aligned with the exhaust outlet 70. However, the exhaust fan 138 may be positioned in other locations within the cabinet cavity 68.

An air gap 170 is positioned between the inner tub surface 96 of the tub 76 and the outer drum surface 116 of the drum 104. The air gap 170 includes a first air gap portion 172 and a second air gap portion 174. The first air gap portion 172 extends radially between the tub sidewall 88 and the drum sidewall 114 and axially between the front drum end 106 and the rear drum end 108. The first air gap portion 172 is arranged in fluid communication with the tub inlet 100 and the second air gap portion 174. Additionally, a seal 176 extends annularly about the front drum opening 110 and is positioned between the front tub opening 84 and the front drum opening 110 to direct air entering through the tub inlet 100 to the first air gap portion 172. The second air gap portion 174 extends axially between the rear tub wall 86 and the rear drum wall 112. The second air gap portion 174 is arranged in fluid communication with the laundry compartment 130 via the drum inlet 126 that extends through the rear drum wall 112. In other words, the drum inlet 126 is configured to permit the passage of drying air from the second air gap portion 174 to the laundry compartment 130 of the drum 104.

A heater 178 including at least one heating element 180 is positioned to heat air passing through the air gap 170 such that drying air is received within the laundry compartment 130 via the drum inlet 126. In the illustrated example, the heating elements 180 are positioned on the tub sidewall 88 and the heater 178 heats air flowing through the first air gap portion 172. Accordingly, the rim 90 of the tub 76 may heat to a high temperature. The bellows 102 covers the rim 90 to prevent a user of the laundry appliance 50 from contacting the rim 90 of the tub 76 when reaching through the front cabinet opening 56 and into the laundry cabinet 130.

The heating elements 180 may be disposed on or in the entirety of the tub sidewall 88 or disposed on or in select regions of the tub sidewall 88. For example, the heating elements 180 may be positioned in a plurality of regions that each extend annularly about the tub sidewall 88 in an axially spaced apart arrangement. In another example, the heating elements 180 may be disposed in a plurality of regions that extends axially and parallel to the axis 120 in a radially spaced apart arrangement. Additionally, the heating elements 180 may form a pattern. For example, the heating elements 180 may extend helically (i.e., spiral) about the tub sidewall 88 in a clockwise pattern or a counterclockwise pattern. In another example, the heating elements 180 may be disposed in a serpentine pattern that may extend back and forth from the front tub end 78 to the rear tub end 80, or any distance in between. In yet another example, the heating elements 180 may be disposed in a linear pattern (i.e., strips) that extends between the front tub end 78 and the rear tub end 80, or any distance in between.

Examples of the heater 178 include a resistance heater, an induction heater, an infrared heater, and a heat pump. In the example of the resistance heater, an electrical current passes through the heating element 180 and generates heat due to resistance created within the heating element 180 from the electrical current. As such, the heating element 180 may be composed of an electrically conductive material. In one example, the heating element 180 is composed of nichrome. The resistance heater may alternatively be in the form of heat tape. For example, the heat tape may be wrapped helically around the outer tub surface 94 of the tub sidewall 88. Therefore, heat tape provides a low-cost solution for the heater 178 that is simple and easy to package within the cabinet 52.

Similar to the resistance heater, an induction heater generates heat by an electric current passing through the heating elements 180. However, the heating element 180 for the induction heater is an induction coil and an alternating electrical current flows through the induction coil. The induction coil is composed of a conductive material. For example, the induction coil may be composed of copper. In the example where the heater 178 is an infrared heater, the infrared heater emits infrared waves that are used to heat the outer tub surface 94. The heating element 180 is a heater coil composed of a conductive material. For example, the heater coil may be composed of tungsten. In the example where the heater 178 is a heat pump heater, air is pumped into coils that are filled with refrigerant and the refrigerant in the coils is compressed, thereby releasing heat.

Insulation 182 may be disposed over the heater 178 and is positioned in at least the same region(s) as the heating elements 180 to limit the amount of heat generated by the heater 178 that is released into the cabinet cavity 68. For example, the insulation 182 may extend from the front tub end 78 to the rear tub end 80 when the heater 178 is disposed on or in the tub sidewall 88. The insulation 182 is composed of any material that has thermal insulating material properties. For example, the insulation 182 may be composed of polyester fiber, treated cotton, fiberglass, or foam.

With reference to FIG. 3, an air flow path is defined when the exhaust fan 138 is activated. Air enters the laundry appliance 50 via the cabinet air inlet 72 along flow path F1. Air flows from the cabinet air inlet 72 though the cabinet cavity 68 and into the tub inlet 100 along flow path F2. Air flows from the tub inlet 100 to the first air gap portion 172. Air in the first air gap portion 172 flows from the front tube end 78 to the rear tub end 80 along flow path F3 and is heated using the at least one heating element 180 of the heater 178. Air then flows from the first air gap portion 172 to the second air gap portion 174. Air in the second air gap portion 174 then flows into the laundry compartment 130 of the drum 104 to via the drum inlet 126 along flow path F4. Air in the laundry compartment 130 of the drum 104 flows to the first exhaust duct end 140 and the first exhaust duct segment 152 via the first exhaust port 144 along flow path F5. Air in the first exhaust duct segment 152 flows through the removable lint screen 136 and to the second exhaust duct segment 154 along flow path F6. Air in the second exhaust duct segment 154 flows to the exhaust fan 138 and air is pushed out from the exhaust fan 138 to the third exhaust duct segment 156 along flow path F7. Air in the third exhaust duct segment 156 flows to the second exhaust duct end 142 and is released from the laundry appliance 50 via the exhaust outlet 70 of the cabinet 52 along flow path F8.

FIG. 4 illustrates another exemplary laundry appliance 50' that is constructed in an alternative configuration. The primary difference between the laundry appliance 50 and the laundry appliance 50' is that the laundry appliance 50' includes an inner door 98' and a second exhaust port 146'. Some of the elements of the laundry appliance 50' shown in FIG. 4 are the same or similar to the elements of the laundry appliance 50 shown in FIGS. 1-3 and therefore share the same reference numbers, but have been annotated with a prime symbol (') after the reference numerals.

Like the laundry appliance 50 shown in FIGS. 1-3, the laundry appliance 50' includes a cabinet 52', a tub 76' mounted inside the cabinet 52' and a drum 104' positioned in the tub 76'. The cabinet 52' includes an exhaust outlet 70' and a cabinet air inlet 72'. The tub 76' includes front tub wall 82' having a front tub opening (not shown), a rear tub wall 86' and a tub sidewall 88' that extends between the front and rear tub walls 82', 86'. The drum 104' includes a front drum opening 110' at a front drum end 106' and a laundry compartment 130' within the drum 104'. The front drum opening 110' and the front tub opening are aligned with one another. The laundry appliance 50' includes an exhaust system 132' that includes an exhaust duct 134', a removable lint screen 136' and an exhaust fan 138'. The exhaust duct 134' extends between a first exhaust duct end 140' arranged in fluid communication with the laundry compartment 130' and a second exhaust duct end 142' arranged in fluid communication with the exhaust outlet 70. Additionally, the laundry appliance 50' includes a heater 178' with at least one heating element 180' positioned on the tub sidewall 88'. Insulation 182' may be disposed over the heater 178'.

In the embodiment shown in FIG. 4, the inner door 98' is pivotally connected to the tub 76' and swings between an open position and a closed position. In the closed position, the inner door 98' shuts or closes the front tub opening. The inner door 98' is positioned inboard of the outer door 99', which is pivotally connected to the cabinet 52'. In one example, the inner door 98' is attached to the outer door 99'. In another example, the inner door 98' is independently movable relative to an outer door 99'.

The second exhaust port 146' extends through the inner door 98'. The second exhaust port 146' extends between a first exhaust port end 148' and a second exhaust port end 150'. When the inner door 98' is in the closed position, the first exhaust port end 148' is arranged in fluid communication with the laundry compartment 130' and the second exhaust port end 150' is arranged in fluid communication with the first exhaust duct end 140. Also when the inner door 98' is the closed position, the first exhaust port end 148 is aligned with the front drum opening 110' and the second exhaust port end 150' is aligned with the first exhaust duct end 140' of the exhaust duct 134'. Accordingly, air enters the second exhaust port 146' from the laundry compartment 130' via the first exhaust port end 148' and air exits the second exhaust port 146' and passes into the first exhaust duct end 140'.

In yet another example (not shown), the second exhaust port end 150' may vent directly to outside the cabinet, thus eliminating the need for the exhaust duct 134'.

FIG. 5 illustrates another exemplary laundry appliance 50' that is constructed in an alternative configuration. The primary difference between the laundry appliance 50 and the laundry appliance 50" is that the laundry appliance 50" includes a heater 178" with at least one heating element 180" positioned on or in the tub sidewall 88" and the rear tub wall 86". Some of the elements of the laundry appliance 50" shown in FIG. 5 are the same or similar to the elements of the laundry appliance 50 shown in FIGS. 1-3 and therefore share the same reference numbers, but have been annotated with a prime symbol (") after the reference numerals.

Like the laundry appliance 50 shown in FIGS. 1-3, the laundry appliance 50" includes a cabinet 52", a tub 76" mounted inside the cabinet 52" and a drum 104" positioned in the tub 76". The cabinet 52" includes a front cabinet wall 54" having a front cabinet opening 56" and a rear cabinet wall 58" having an exhaust outlet 70" and a cabinet air inlet 72". A front appliance door 74" is pivotally connected to the front cabinet wall 54" to open and close the front cabinet opening 56". The tub 76" includes front tub wall 82" having a front tub opening 84", a rear tub wall 86" and a tub sidewall 88" that extends between the front and rear tub walls 82". 86". The drum 104" includes a front drum opening 110" at a front drum end 106", a rear drum wall 112" at a rear drum end 108", and a drum sidewall 114" that extends between the front and rear drum ends 106", 108". The front drum end 106", rear drum end 108", and drum sidewall 114" cooperate to define a laundry compartment 130". The laundry appliance 50' includes an exhaust system 132" that includes an exhaust duct 134", a removable lint screen 136" and an exhaust fan 138". A first air gap portion 172 extends radially between the tub sidewall 88" and the drum sidewall 114" and is arranged in fluid communication with the cabinet air inlet 72". A second air gap portion 174" extends axially between the rear tub wall 86" and the rear drum wall 112" and is arranged in fluid communication with the laundry compartment 130".

The heating elements 180" of the heater 178" are positioned on or in the tub sidewall 88" and the rear tub wall 86". Accordingly, the heater 178" heats air flowing through the first and second air gap portions 172", 174". The heating elements 180" may be disposed on or in the entirety of the tub sidewall 88" and the rear tub wall 86" or disposed on or in select regions of the tub sidewall 88" and the rear tub wall 86". Additionally, the heating elements 180" may form a pattern. Examples of the heater 178" include a resistance heater, an induction heater, an infrared heater, and a heat pump.

Insulation 182" may be disposed over the heater 178" and is positioned in at least the same region(s) as the heating elements 180" to limit the amount of heat generated by the heater 178" that does not heat the tub 104". Accordingly, insulation 182" extends along the tub sidewall 88" and the rear tub wall 86".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A laundry appliance, comprising:

a cabinet;

a tub positioned inside the cabinet, the tub including a front tub wall having a front tub opening, a rear tub wall opposite the front tub wall, and a tub sidewall that extends between the front tub wall and the rear tub wall;

a drum rotatably supported within the tub, the drum including a front drum opening, a rear drum wall opposite the front drum opening, a drum sidewall that extends between the front drum opening and the rear drum wall, and a laundry compartment positioned inside the drum that is accessible through the front drum opening;

an air gap positioned radially between the tub sidewall and the drum sidewall; and at least one heating element positioned on or in the tub sidewall to heat the tub sidewall and therefore air flowing through the air gap between the tub sidewall and the drum sidewall.

2. The laundry appliance of claim 1, wherein the tub includes a tub inlet that extends through the tub sidewall and is positioned adjacent to the front tub wall.

3. The laundry appliance of claim 2, further comprising:

an air outlet that is positioned adjacent to the front drum opening and configured to receive drying air after the drying air passes through the laundry compartment in the drum.

4. The laundry appliance of claim 3, further comprising:

a bellows positioned between the front tub wall and the cabinet, wherein the bellows extends annularly about the front tub opening and the air outlet extends through the bellows.

5. The laundry appliance of claim 2, further comprising:

a seal that extends annularly about the front drum opening and is positioned between the front tub opening and the front drum opening such that the seal is configured to direct air entering through the tub inlet to the air gap between the tub sidewall and the drum sidewall.

6. The laundry appliance of claim 1, wherein the drum includes a drum inlet extending through the rear drum wall and configured to permit passage of drying air from the air gap to the laundry compartment inside the drum.

7. The laundry appliance of claim 6, wherein the drum inlet includes a plurality of perforations extending through the rear drum wall.

8. The laundry appliance of claim 1, wherein the at least one heating element includes a plurality of heating elements positioned on the tub sidewall.

9. The laundry appliance of claim 1, further comprising:

insulation disposed over the at least one heating element on the tub sidewall.

10. A laundry appliance, comprising:

a cabinet including a cabinet air inlet and an exhaust outlet;

a tub positioned inside the cabinet, the tub including a front tub wall having a front tub opening, a rear tub wall opposite the front tub wall, and a tub sidewall that extends between the front tub wall and the rear tub wall;

a drum rotatably supported within the tub, the drum including a front drum opening, a rear drum wall opposite the front drum opening, a drum sidewall that extends between the front drum opening and the rear drum wall, and a laundry compartment positioned inside the drum;

an exhaust duct positioned inside the cabinet, the exhaust duct including a first exhaust duct end that is arranged in fluid communication with the front drum opening and a second exhaust duct end that is arranged in fluid communication with the exhaust outlet of the cabinet;

an air gap positioned radially between the tub sidewall and the drum sidewall; and a heater positioned to heat air passing through the air gap between the tub sidewall and the drum sidewall before the air passes into the drum through a drum inlet in the rear drum wall.

11. The laundry appliance of claim 10, further comprising:

a bellows positioned between the cabinet and the front tub wall, wherein the bellows extends annularly about the front tub opening.

12. The laundry appliance of claim 11, wherein the first exhaust duct end is arranged in fluid communication with an exhaust port that extends through the bellows.

13. The laundry appliance of claim 10, further comprising:

an inner door pivotally attached to at least one of the cabinet and the tub such that the inner door opens and closes the tub opening and wherein an exhaust port extends through the inner door and is configured to communicate drying air from the laundry compartment to the first exhaust duct end.

14. The laundry appliance of claim 10, wherein the tub includes a tub inlet that extends through the tub sidewall and is positioned adjacent to the front tub wall.

15. The laundry appliance of claim 10, wherein the heater is at least one of a resistance heater, an induction heater, an infrared heater, and a heat pump.

16. The laundry appliance of claim 10, wherein the heater includes at least one heating element mounted to the tub sidewall.

17. The laundry appliance of claim 10, wherein the heater includes heating elements mounted to both the tub sidewall and the rear tub wall.

18. A laundry appliance, comprising:

a cabinet including a cabinet air inlet and an exhaust outlet;

a tub positioned inside the cabinet, the tub including a front tub wall having a front tub opening, a rear tub wall opposite the front tub wall, and a tub sidewall that extends between the front tub wall and the rear tub wall;

a drum rotatably supported within the tub, the drum including a front drum opening, a rear drum wall opposite the front drum opening, a drum sidewall that extends between the front drum opening and the rear drum wall, and a laundry compartment positioned inside the drum;

an exhaust duct positioned inside the cabinet that extends from a first exhaust duct end positioned near the front tub opening and a second exhaust duct end arranged in fluid communication with the exhaust outlet of the cabinet;

an exhaust fan positioned in fluid communication with the exhaust duct to pull air in from the laundry compartment through the first exhaust duct end and push air out through the second exhaust duct end and the exhaust outlet of the cabinet;

an air gap positioned radially between the tub sidewall and the drum sidewall; and at least one heating element positioned to heat air flow passing through the air gap between the tub sidewall and the drum sidewall before the air flow passes into the drum through a drum inlet in the rear drum wall.

19. The laundry appliance of claim 18, wherein the tub includes a tub inlet that is arranged in fluid communication with the cabinet air inlet and the air gap.

20. The laundry appliance of claim 19, wherein an air flow path is defined when the exhaust fan is activated, where air enters the cabinet air inlet and flows to the tub inlet, then flows from the tub inlet to the air gap, then flows through the air gap where the air flow is heated using the at least one heating element, and then flows from the air gap and towards the rear tub wall and passes into the drum via the drum inlet, and then flows through the laundry compartment in the drum and to the first exhaust duct end where it enters the exhaust duct and is carried to the exhaust outlet of the cabinet.

* * * * *